United States Patent [19]

Bäbler et al.

[11] Patent Number: 5,362,780
[45] Date of Patent: Nov. 8, 1994

[54] COMPOSITIONS BASED ON 2,9-DICHLOROQUINACRIDONE PIGMENTS

[75] Inventors: Fridolin Bäbler, Hockessin; Charles G. Orange, Bear; Edward E. Jaffe, Wilmington, all of Del.

[73] Assignee: Ciba-Geigy Corporation, Ardsley, N.Y.

[21] Appl. No.: 77,974

[22] Filed: Jun. 15, 1993

[51] Int. Cl.$^5$ ................................................ C08K 5/34
[52] U.S. Cl. .......................................... 524/88; 524/90
[58] Field of Search ................... 106/288 A, 308 S; 524/88, 90

[56] References Cited

U.S. PATENT DOCUMENTS

| | | | |
|---|---|---|---|
| 4,692,189 | 9/1987 | Bäbler et al. | 106/308 |
| 5,095,056 | 3/1992 | Bäbler et al. | 524/90 |
| 5,135,972 | 8/1992 | Kluger et al. | 524/88 |
| 5,252,634 | 10/1993 | Patel et al. | 523/218 |

FOREIGN PATENT DOCUMENTS 3264679  11/1988  Japan ................................. 524/88

OTHER PUBLICATIONS

Chem. Abst. 118:148782g.
Chem. Abst. 118:40820d.
Chem. Abst. 84:5903r.
Chem. Abst. 76:87303s.

*Primary Examiner*—Kriellion S. Morgan
*Attorney, Agent, or Firm*—George R. Dohmann

[57] ABSTRACT

A violet quinacridone pigment composition comprising a pigmentary 2,9-dichloroquinacridone pigment having a specific surface area below 75 m$^2$/g and a sulfonated indanthrone or copper phthalocyanine. The compositions have excellent fastness properties when used for pigmenting engineering plastics.

20 Claims, No Drawings

COMPOSITIONS BASED ON 2,9-DICHLOROQUINACRIDONE PIGMENTS

SUMMARY

The present invention relates to a heat-stable violet pigment composition comprising a 2,9-dichloroquinacridone pigment and a sulfonic acid derivative of an indanthrone or a copper phthalocyanine compound. The violet pigment compositions are useful for pigmenting engineering plastics.

BACKGROUND

The object of the present invention is to provide a violet-colored quinacridone pigment of high saturation which has the heat stability required for utility as a pigment in engineering plastics. This object is achieved by preparing violet pigment compositions comprising a 2,9-dichloroquinacridone pigment in combination with a sulfonic acid or a sulfonic acid salt of a blue-colored indanthrone or copper phthalocyanine.

Quinacridones are valuable pigments. The beta crystal modification of the unsubstituted quinacridone, C.I. Pigment Violet 19, is known for its attractive violet color. Although it is of coloristic interest, the violet-colored beta-phase of unsubstituted quinacridone possesses insufficient heat stability to have utility for pigmenting the engineering plastics.

Since 2,9-dichloroquinacridone having a specific surface area below 30 m²/g has good heat stability, it is useful for pigmenting engineering plastics. However, due to its large particle size, the color is shifted to a unique red color shade from the known magenta color of smaller particle size 2,9-dichloroquinacridone. Thus, no violet colored quinacridone pigment is known to possess the heat-stability required for utility as a pigment for the engineering plastics.

Indanthrone and copper phthalocyanine are known in the art as blue pigments which possess good heat stability. The sulfonic acid derivatives of indanthrone and copper phthalocyanine are known as dyestuffs and as intermediates in the preparation of dyestuffs.

The present invention is based on the discovery that violet pigment compositions comprising a 2,9-dichloroquinacridone pigment in combination with a sulfonic acid or a sulfonic acid salt of a blue-colored indanthrone or copper phthalocyanine possess high saturation and the heat stability required for utility as a pigment in engineering plastics. In addition, the inventive pigment compositions are highly dispersible in the plastic medium to be pigmented. Thus, the inventive compositions provide a violet quinacridone pigment which is suitable for the utility of pigmenting engineering plastics.

Although violet mixtures of pigmentary indanthrone or copper phthalocyanine with pigmentary 2,9-dichloroquinacridone can be prepared, a larger amount of the blue pigment is needed in order to achieve the desired violet color. Because of the larger amount of the blue pigment required, the saturation of these pigment mixtures is too low. In addition, these pigment mixtures are not as homogeneously dispersed in the plastic medium as the present compositions.

DETAILED DESCRIPTION

The present pigment compositions comprise (A) a 2,9-dichloroquinacridone pigment having a specific surface area below 75 m²/g, and (B) a sulfonic acid derivative of an indanthrone or a copper phthalocyanine compound, or a salt thereof.

The compositions according to this invention comprise components (A) and (B). Component (A) is a 2,9-dichloroquinacridone of formula I having a specific surface area below 75 m²/g.

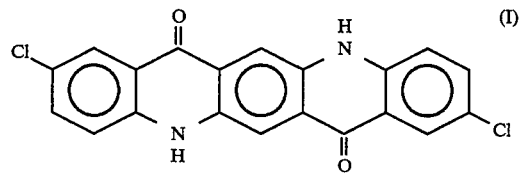

Component (B) is a sulfonated indanthrone or copper phthalocyanine compound of Formula II $$P-(SO_3H)_m \quad (II)$$

or a salt thereof; wherein m has a value from 0.2 to 4.0, preferably from about 0.5 to about 2.0, most preferably from about 0.9 to about 1.1; and P is an indanthrone radical of Formula III

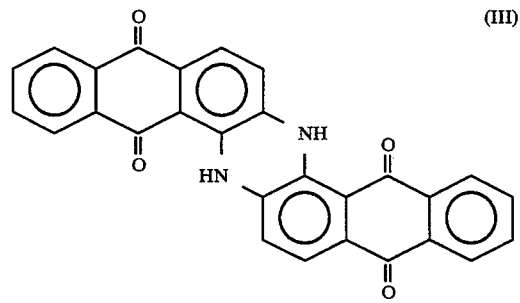

or a copper phthalocyanine radical of Formula IV

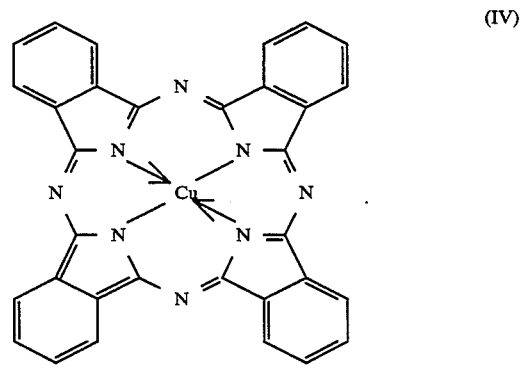

Component (B) is the sulfonic acid of formula II or a salt thereof. If component (B) is a salt, it is preferably a monovalent metal salt, divalent metal salt, trivalent metal salt or ammonium salt of the sulfonic acid of formula II. The metal salt is preferably an alkali metal, an alkaline earth metal or zinc or aluminum salt of the compound of formula II. The ammonium salts are preferably those wherein the ammonium radical is represented by the formula $N^{+(R)}_4$, wherein each R is independently of the others hydrogen, $C_1-C_{18}$-alkyl, phenyl or phenyl which is substituted by $C_1-C_{18}$-alkyl. Component (B) is most preferably the sulfonic acid of formula II or a sodium or calcium salt thereof.

The sulfonated indanthrone of formula III and the sulfonated copper phthalocyanine of formula IV are preferably unsubstituted, unsubstituted meaning that there are no substituents other than hydrogen. However, blue-colored, substituted, sulfonated indanthrones and copper phthalocyanines are also effective in the inventive compositions. Thus, certain substituted, sulfonated indanthrones and copper phthalocyanines, especially those substituted in the phenyl rings by chlorine or bromine, can be used as component (B) of the inventive compositions.

In general, the compositions contain from about 88 to 99.9 percent, preferably 97 to 99.7 percent, by weight, based on the combined weights of components (A) and (B), of component (A), and 0.1 to about 12 percent, preferably 0.3 to 7 percent, most preferably 0.3 to 3 percent, by weight of component (B).

The specific surface area of component (A) must be below about 75 m$^2$/g. The specific surface area is preferably below 30 m$^2$/g, and most preferably is from 4 to 28 m$^2$/gram. In general, the specific surface area can be obtained by any method and is preferably obtained by the BET method.

Component (A), 2,9-dichloroquinacridone, is known as a pigment and can be prepared by known methods, for example by oxidizing 2,9-dichloro-6,13-dihydroquinacridone. The desired surface area characteristics are obtained by modification of the preparatory process, for example by modification of the synthetic end-step or by a suitable aftertreatment of the pigment crude. Examples of suitable aftertreatments include recrystallization of the crude 2,9-dichloroquinacridone from a polar solvent, for example dimethyl sulfoxide, N-methylpyrrolidone or dimethylformamide. The preparation of suitable 2,9-dichloro-quinacridones is described in U.S. Pat. No. 5,095,056, which is here incorporated by reference.

Indanthrone and copper phthalocyanine are known as pigments. The sulfonated indanthrones and copper phthalocyanines utilized as component (B) are known as dyestuffs and as dyestuff intermediates and can be prepared by known methods, for example, by sulfonating the indanthrone or copper phthalocyanine by sulfonation proceedures known in the art.

The compositions of the present invention are prepared by conventional methods, for example, by mixing the individual components in the desired ratio as dry powders or preferably by mixing the corresponding aqueous presscakes.

In a preferred method, an aqueous suspension of components (A) and (B), in the desired ratio, is stirred for 10 minutes up to about 5 hours, preferably for 1 to 3 hours, generally at a temperature from about 20° to about 90° C. The pigment composition is subsequently isolated by filtration, and then washed and dried.

In a variation of the procedure discussed above, a divalent or trivalent metal salt is added to precipitate the sulfonic acid salt, followed by filtration, washing and drying of the composition.

The present compositions can consist of components (A) and (B). However, the present compositions can also contain additional components customary in pigment compositions such as texture improving agents.

Texture improving agents are especially useful as an additional component which can improve the properties of the inventive compositions. Suitable texture improving agents include fatty acids having at least 12 carbon atoms, and amides esters or salts of said fatty acids, such as stearic acid, behenic acid, lauryl amine, stearylamine. In addition, aliphatic 1,2-diols, epoxidized soya bean oil, waxes, resin acids and resin acid salts are suitable texture improving agents. Rosin acids and rosin acid salts are especially suitable texture improving agents.

The texture improving agent can be incorporated into the composition before, during or after mixing component (A) with component (B). The texture improving agent is preferably incorporated into the present composition in an amount of from 0.05 to 20 percent, most preferably 1 to 10 percent, by weight, based on the combined weights of components (A) and (B).

The compositions of this invention possess high saturation, excellent dispersibility and outstanding heat stability for a pigment composition. This is believed to be because the sulfonic acid derivative covers the surface of the pigment particle to produce a violet pigment particle. Thus, only a small amount of the blue sulfonic acid dyestuff derivative is required to prepare the violet pigment compositions of the present invention.

The present compositions are highly suitable for coloring high molecular weight materials, which can be processed to casted and molded articles.

The pigment compositions are normally utilized to pigment high molecular weight organic materials, in particular engineering plastics. Suitable high molecular weight organic materials include thermoplastics, thermoset plastics or elastomers, for example, cellulose ethers; cellulose esters such as ethyl cellulose; linear or crosslinked polyurethanes; linear, crosslinked or unsaturated polyesters; polycarbonates, polyolefins such as polyethylene, polypropylene, polybutylene or poly-4-methylpent-1- ene; polystyrene; polysulfones; polyamides, polycycloamides, polyimides, polyethers, polyether ketones such as polyphenylene oxides, and also poly-p-xylene, polyvinyl halides such as polyvinyl chloride, polyvinylidene chloride or fluoride, polytetrafluoroethylene, polyacrylonitrile, acrylic polymers, polyacrylates, polymethacrylates, rubber, silicone polymers, phenol/formaldehyde resins, melamine/formaldehyde resins, urea/formaldehyde resins, epoxy resins, styrene butadiene rubber, acrylonitrile-butadiene rubber or chloroprene rubber, singly or in mixtures.

Generally, the compositions are used in an mount of 0.01 to 30% by weight, preferably 0.1 to 10% by weight, based on the weight of the high molecular weight organic material to be pigmented.

Many organic pigments demonstrate insufficient heat stability to be used in engineering plastics. This poor heat stability is believed to be due to partial solubility of the pigment at high temperatures, thereby producing fluorescence when the colored parts are viewed under UV light. Colored engineering plastics containing the present pigment compositions are substantially fluorescence free and show a minimal change in color at elevated temperatures, in particular for the temperature range of 400° F. to 600° F. Thus, the dulling and/or change of color related to the exposure other violet quinacridone pigments to elevated temperatures are substantially eliminated by the inventive pigment compositions.

Pure, high chroma, useful new color shades can be obtained when the present pigment compositions are mixed with other organic and/or inorganic pigments and/or polymer soluble dyes. Furthermore, the present pigment compositions are highly dispersible and can be readily incorporated into organic matrixes to provide homogenous colorations possessing high opacity, saturation and excellent light and weather fastness properties.

The high molecular weight organic materials are pigmented with the pigment compositions of present invention by mixing the composition, if desired in the form of a master batch, into substrates using high shear techniques including roll mills or a mixing or grinding apparatus. The pigmented material is then brought into the desired final form by known methods, such as calendering, pressing, extruding, brushing, casting or injection molding. The pigmented molded articles utilizing the present compositions are, in particular, those obtained by orientating stress, for example, molding and casting, ribbons, fibers or rolled sheets.

Non-rigid moldings can be produced, or polymer brittleness can be reduced, by incorporating plasticizers into the high molecular weight compounds before the shaping operation. Suitable plasticizers include, for example, esters of phosphoric acid, phthalic acid or sebacic acid. Plasticizers can be incorporated into the polymers either before or after the incorporation of the pigment composition of this invention.

The following examples are intended to further describe, but not to further limit, the scope of the present invention. In these examples all pans given are by weight unless otherwise indicated.

EXAMPLE 1

400 grams of an aqueous pigment presscake containing 125 g of 2,9-dichloroquinacridone, having a specific surface area of 21 $m^2/g$ is reslurried in 700 ml water. The pigment suspension is transferred into a 3 liter flask equipped with a stirrer, thermometer and a condenser. 3.8 grams of indanthrone blue monosulfonic acid is added and the mixture is heated to 80° C. and stirred at about 80° C. for 3 hours. 1.5 grams calcium chloride, dissolved in 50 ml of water, is added and the violet pigment suspension is stirred for another 30 minutes and then filtered. The presscake is washed with water until salt free, dried at 80° C. in an oven, and pulverized to yield 126 grams violet pigment powder, having a specific surface area of 21 $m^2/g$. The violet pigment composition so obtained is suitable for coloring engineering plastics and gives colorations of high color strength with excellent heat stability.

EXAMPLE 2

The procedure of Example 1 is repeated except that an aqueous slurry containing 2.5 grams of copper-phthalocyanine monosulfonic acid is used instead of the indanthrone monosulfonic acid. The procedure yields a powdered, violet pigment composition having a specific surface area of 22 $m^2/g$. The pigment composition has excellent heat and light stability when incorporated into engineering plastics.

EXAMPLE 3

400 grams of an aqueous pigment presscake containing 125 grams of 2,9-dichloroquinacridone having a specific surface area of 21 $m^2/g$ and an aqueous slurry containing 2.5 grams copper phthalocyanine monosulfonic acid are mixed together at room temperature in an osterizer/blender (OSTER). The violet slurry so obtained is filtered and dried in an oven at 80° C. The dried presscake is pulverized to yield 127 grams of a powdered, violet pigment composition having a surface area of 21 $m^2$/grams. The pigment composition has excellent heat and lightfastness properties when incorporated into engineering plastics.

EXAMPLE 4

The procedure of Example 2 is repeated except that an aqueous slurry containing 2.7 grams of copper phthalocyanine disulfonic acid is used instead of 2.5 grams of copper phthalocyanine monosulfonic acid. The procedure yields a powdered, violet pigment composition which has good fastness properties when incorporated into engineering plastics.

EXAMPLE 5

A 1 liter glass flask is charged with 50 grams of 2,9-dichloroquinacridone pigment powder having a specific surface area of 22 $m^2/g$ and 3 grams of indanthrone monosulfonic acid sodium salt. The mixture is blended for 45 minutes by rolling on a roller gear table. A violet pigment composition, having a specific surface area of 22 $m^2/g$, was obtained. The pigment composition shows excellent fastness properties when incorporated into engineering plastics like ABS or nylon-6.

EXAMPLE 6

A 2 liter flask equipped with a thermometer, stirrer and condenser is charged with 50 grams of 2,9-dichloroquinacridone pigment powder having a specific surface area of 18 $m^2/g$, 1.5 grams indanthrone monosulfonic acid and 500 ml water. The suspension is stirred for 2 hours at 80°–85° C. 1.5g calcium chloride dissolved in 50 ml water is added and the mixture is cooled to 40° C. The violet suspension is filtered, and the presscake is washed with water until salt free. The resulting pigment composition is dried in an oven at 80° C. The dried pigment composition is pulverized to yield 50.5 grams of powdered, violet pigment composition having a specific surface area of 18 $m^2/g$. The pigment composition has excellent heat and light stability when incorporated into engineering plastics.

EXAMPLE 7

57.5 grams of an aqueous presscake containing 15 grams of 2,9-dichloroquinacridone having a specific surface area of 20 $m^2/g$, 30 grams of an aqueous slurry containing 0.3 grams of copper phthalocyanine monosulfonic acid and 0.45 grams of a sodium salt of a rosin dissolved in 130 ml. of water (DRESINATE X, from HERCULES Corp.) are blended together to form a suspension. 3.6 grams of calcium chloride dissolved in 30 ml. of water is added to the stirred suspension, precipitating the calcium salt of the rosin. The resulting homogeneous pigment suspension is then filtered to form a presscake. The presscake is washed with water until salt-free and subsequently dried. The procedure yields 15 grams of a violet pigment composition having a specific surface area of 20 $m^2/g$. The pigment composition has excellent fastness properties when incorporated into engineering plastics like ABS or polycarbonate.

EXAMPLE 8

63.0 grams of polyvinylchloride, 3.0 grams epoxidized soya bean oil, 2.0 grams of barium/cadmium heat stabilizer, 32.0 grams dioctyl phthalate and 1.0 gram of the pigment composition prepared according to Example 1 are mixed together in a glass beaker using a stirring rod. The mixture is formed into a soft PVC sheet with a thickness of about 0.4mm by rolling for 8 minutes on a two roll laboratory mill at a temperature of 160° C., a roller speed of 25 rpm and friction of 1:1.2 by constant folding, removal and feeding. The resulting soft PVC sheet is colored in a tinctorally attractive violet shade with excellent fastness to heat, light and migration.

EXAMPLE 9

5 grams of pigment composition prepared according to Example 4, 2.5 grams CHIMASORB 944 LD (hindered amine light stabilizer), 1.0 gram TINUVIN 328 (benzotriazole UV absorber), 1.0 gram IRGANOX 1010 (hindered phenol antioxidant) and 1.0 gram IRGANOX 168 (phosphite process stabilizer) (all additives from CIBA-GEIGY Corp.) are mixed in a BANBURY mixer together with 1000 grams of high density polyethylene, QUANTUM MICROTHENE MA-778 from U.S.I QUANTUM Chem. at a speed of 175–200 rpm for 30 seconds after flux. The fluxed pigmented resin is chopped up while warm and malleable, and then fed through a granulator. The resulting granules are molded on a BATTENFELD 1000 injection molder with a 5 minute dwell time and a 30-second cycle time at temperatures of 205° C., 260° C. and 315° C., respectively. Homogenous colored chips were obtained showing a similar violet color at each of the temperature steps, thus, demonstrating excellent heat stability of the pigment composition prepared according to the invention.

EXAMPLE 10

The following mixture is prepared in a fluid mixer by stirring for about 5 minutes at a speed of 1400 rpm.

| | |
|---|---|
| 92.0 grams - | vinyl resin (VINNOL H65D, WACKER) |
| 8.0 grams - | vinyl copolymer (VESTOLIT HIS 7587, HüLS) |
| 1.5 grams - | epoxidized soya bean oil plasticizer |
| 2.8 grams - | barium/cadmium stabilizer |
| 0.7 grams - | organic phosphite auxiliary stabilizer (IRGASTAB CH-300, CIBA-GEIGY) |
| 0.4 grams - | fatty acid ester (IRGAWAX 370, CIBA-GEIGY) |
| 0.2 grams - | paraffin oil derivative lubricant (IRGAWAX 360, CIBA-GEIGY) |
| 0.25 grams - | benzotriazole derivative light stabilizer (TINUVIN 320, CIBA-GEIGY) |

A mixture of 1.5 parts by weight of the rigid PVC mixture so obtained is combined with 0.05 parts by weight of a composition which was prepared according Example 3, is mixed in a HENSCHEL-mixer at room temperature for about 3 minutes at a speed of about 20 00rpm. The pigmented rigid PVC so obtained is pressed on a roll mill for 6 minutes at 190° C., 25 rpm and a friction of 1:1.2, and then pressed at 190° C. for 6 minutes on a BURKLE press between chromium-plated steel plates to a thickness of about 1 mm. The pressed sheet so obtained is of violet color exhibiting excellent fastness to light and weathering.

EXAMPLE 11

The procedure of Example 9 is repeated using polypropylene HIMONT PRO-FAX 6401 from HIMONT instead of high density polyethylene as a substrate to yield violet colored chips which show excellent heat and lightfastness properties.

EXAMPLE 12A

Six grams of a pigment composition prepared according Example 2, 9 grams TINUVIN 770 (hindered amine light stabilizer) 3 grams TINUVIN 328 (benzotriazole UV absorber), 3 grams IRGANOX 245 (hindered phenol antioxidant), all additives from CIBA-GEIGY Corp., are mixed in a BANBURY mixer together with 1200 grams ABS resin GPM 5600 from GENERAL ELECTRIC at a speed of 175–200 rpm for 30 seconds after flux. The fluxed pigmented resin is chopped up while warm and malleable, and then fed through a granulator. The resulting granules are molded on a BATTENFELD 1000 injection molder with a 7 minute dwell time and a 42-second cycle time at temperatures of 232° C. (450° F.) and 288° C. (550° F.) respectively. Obtained are homogenously colored chips which show similar violet color shades at each of the temperature steps.

EXAMPLE 12B

The procedure of Example 12A is repeated using 6 grams of a commercially available unsubstituted beta quinacridone pigment (MONASTRAL VIOLET R RT-891-D from CIBA) instead of a pigment composition according to this invention.

The total color difference values, $\Delta E$, of the chips molded at 232° C. and 288° C. were measured on a color spectrophotometer with D-65 illuminant, C.I.E. lab scale and 10 degree observer with specular component included. The chips prepared according to Example 12A have a $\Delta E$ of 1.4 while the chips prepared according to Example 12B have a $\Delta E$ of 5.2. This result demonstrates that the present composition has superior heat stability when compared to the commercial unsubstituted beta quinacridone pigment. When the chips are exposed to UV light, the chip containing the composition according to this invention is essentially fluorescence free while the chip containing commercial beta quinacridone pigment shows a strong yellowish fluorescence.

EXAMPLE 12C

The procedure of Example 12A is repeated using a blend of 20 grams of a commercially available 2,9-dichloroquinacridone pigment with a specific surface area of 22 $m^2/g$ and 1.2 grams of commercially available indanthrone pigment instead of the pigment composition of this invention. A yellowish fluorescence is observed by exposing the chips molded at 288° C. to UV light.

EXAMPLE 12D

The procedure of Example 12A is repeated using a blend of 20 grams of a commercially available 2,9-dichloroquinacridone pigment with a specific surface area of 22 $m^2/g$ and 1.2 grams of commercially available copper phthalocyanine pigment instead of the pigment composition of this invention. A yellowish fluorescence is observed by exposing the chips molded at 288° C. to UV light.

EXAMPLE 13

A mixture of 100 g of polyethylene terephthalate granules and 0.5 g of a composition prepared according to Examples 1 to 7 is blended for 15 minutes in a glass bottle on a roller gear bed. Extrusion of the mixture into a ribbon in a laboratory extruder produces a ribbon colored in a uniform violet color possessing excellent light and heat fastness.

EXAMPLE 14

The procedure described in Example 13 is repeated using APILON 52-651 polyurethane (API spc Mussolente, Italy) to yield a violet polyurethane ribbon having excellent lightfastness.

EXAMPLE 15

The procedure of Example 13 is repeated using ULTRANYL, KR 4510 polyphenylene ether/polyamide blend (BASF) to yield a ribbon having a uniform violet color with excellent fastness properties.

EXAMPLE 16

The procedure of Example 13 is repeated using DEGALAN G7 polymethylmethacrylate granules (DEGUSSA) to yield a ribbon having a violet shade with excellent fastness properties.

EXAMPLE 17

The procedure of Example 9 is repeated using VESTAMID polyamide granules (HUELS) to yield violet colored chips showing excellent heat and lightfastness properties.

EXAMPLE 18

The procedure of Example 13 is repeated using polycarbonate (LEXAN from GENERAL ELECTRIC) to yield a ribbon having a uniform, strong violet color with excellent fastness properties.

We claim:

1. A violet-colored pigment composition which comprises
   (A) a 2,9-dichloroquinacridone pigment having a specific surface area below 75m²/gram; and
   (B) a sulfonic acid of formula II $$P-(SO_3H)_m \qquad (II)$$

or a salt thereof; wherein P is a blue-colored indanthrone radical or a blue-colored copper phthalocyanine radical, and m is from 0.2 to 4.0.

2. A composition of claim 1, wherein the specific surface area of component (A) is less than 30 m²/gram.

3. A composition of claim 2, wherein the specific surface area is from 4–28 m²/gram.

4. A composition of claim 1, wherein component (B) is the sulfonic acid of formula II or an alkali metal, an alkaline earth metal or zinc or aluminum salt thereof.

5. A composition of claim 4, wherein component (B) is the sulfonic acid of formula II or a sodium or calcium salt thereof.

6. A composition of claim 1, wherein m is from 0.5 to 2.0.

7. A composition of claim 6, wherein m is from 0.9 to 1.1.

8. A composition of claim 1, wherein the composition comprises from 88 to 99.9 percent by weight of component (A) and from 0.1 to 12.0 percent by weight of component (B), the percentage by weight being based on the combined weights of components (A) and (B).

9. A composition of claim 8, wherein the composition comprises from 97 to 99.7 percent by weight of component (A) and from about 0.3 to about 3 percent by weight of component (B).

10. A composition of claim 1, wherein P is an unsubstituted indanthrone radical.

11. A composition of claim 3, wherein P is an unsubstituted indanthrone radical.

12. A composition of claim 1, wherein P is an unsubstituted copper phthalocyanine radical.

13. A composition of claim 3, wherein P is an unsubstituted copper phthalocyanine radical.

14. A process for preparing a pigmented plastic material, which comprises incorporating of an effective pigmenting amount of a composition of claim 1 into said plastic material.

15. A process of claim 14, wherein the composition is present in said plastic material in a concentration of from 0.01 to about 30 percent by weight, based on the weight of said pigmented plastic material.

16. A process of claim 14, wherein said plastic material is selected from the group consisting of cellulose ethers, cellulose esters, polyurethanes, polyesters, polycarbonates, polyolefins, polystyrene, polysulfones, polyamides, polycycloamides, polyimides, polyethers, polyether ketones, polyvinyl halides, polytetrafluoroethylene, acrylic and methacrylic polymers, rubber, silicone polymers, phenol/formaldehyde resins, melamine/formaldehyde resins, urea/formaldehyde resins, epoxy resins and diene rubbers and copolymers thereof.

17. A composition of claim 1 which further comprises from 0.05 to 20 percent by weight, based on the combined weights of components (A) and (B), of a texture improving agent selected from the group consisting of fatty acids having at least 12 carbon atoms, amides, esters or salts of said fatty acids, aliphatic 1,2-diols, epoxidized soya bean oil, waxes, resin acids and resin acid salts.

18. A composition of claim 17 wherein the texture improving agent is a rosin acid or a rosin acid salt.

19. A composition of claim 17 wherein the texture improving agent is present in an amount of from 1 to 10 percent by weight, based on the combined weights of components (A) and (B).

20. A process for the preparation of a composition of claim 1 which comprises:
   (a) blending an aqueous suspension comprising components (A) and (B) and from about 1 to about 10 percent by weight, based on the combined weight of components (A) and (B), of a water-soluble rosin acid salt;
   (b) precipitating an insoluble salt of the rosin acid by adding a divalent or trivalent metal salt to the suspension; and
   (c) isolating the composition by filtering the suspension.

* * * * *